United States Patent [19]

Sato et al.

[11] Patent Number: 4,714,599

[45] Date of Patent: Dec. 22, 1987

[54] PROCESS FOR PREPARING RHOMBOHEDRAL SYSTEM BORON NITRIDE USING NABH4-AND NH4CL

[75] Inventors: Tadao Sato; Toshihiko Ishii, both of Sakura, Japan

[73] Assignee: National Institute for Researches in Inorganic Materials, Ibaraki, Japan

[21] Appl. No.: 643,318

[22] Filed: Aug. 22, 1984

Related U.S. Application Data

[63] Continuation-in-part of Ser. No. 440,998, Nov. 12, 1982, abandoned.

[30] Foreign Application Priority Data

Apr. 15, 1982 [JP] Japan .................. 57-63067

[51] Int. Cl.$^4$ .................................. C01B 21/064
[52] U.S. Cl. ........................... 423/290; 501/96
[58] Field of Search .................................. 423/290

[56] References Cited

U.S. PATENT DOCUMENTS 4,064,225  12/1977  Chew et al. .................. 423/290
4,468,263  8/1984  Artz et al. ..................... 149/22

OTHER PUBLICATIONS

H. Sumiya et al, "High Pressure Synthesis of Cubic Boron Nitride from Amorphous State", Mat. Res. Bull. vol. 18, pp. 1203–1207 (1983).

Research Report No. 27 by National Institute for Researches in Inorganic Materials, 1981, "Study on Boron Nitride" Sections 2.1.2, 2.1.3 (part).

*Primary Examiner*—John Doll
*Assistant Examiner*—Jackson Leeds
*Attorney, Agent, or Firm*—Oblon, Fisher, Spivak, McClelland, & Maier

[57] ABSTRACT

A process for preparing rhombohedral system boron nitride, which comprises mixing NaBH4 with at least an equimolar amount of NH4Cl, and heating the resulting mixture in a non-oxidizing atmosphere at a temperature of at least 750° C. and lower than 1000° C. for at least 3 hours.

8 Claims, 6 Drawing Figures

Temperature (°C) for the synthesis

Temperature (°C) for the synthesis

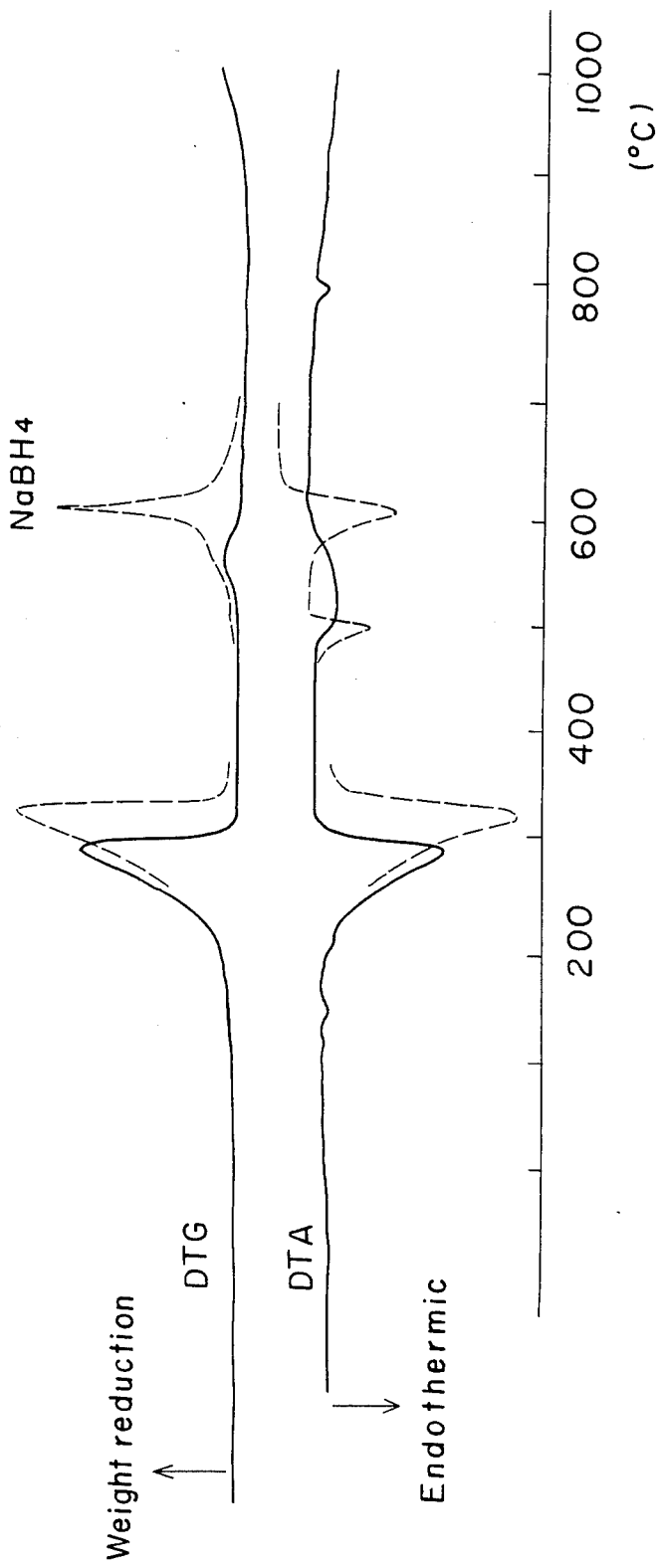

PROCESS FOR PREPARING RHOMBOHEDRAL SYSTEM BORON NITRIDE USING NABH₄-AND NH₄CL

This is a continuation-in-part of application Ser. No. 440,998 filed Nov. 12, 1982, now abandoned.

BACKGROUND OF THE INVENTION

1. Field of the Invention

The present invention relates to a process for preparing rhombohedral system boron nitride (hereinafter referred to simply as "rBN"). More particularly, it relates to a process for producing a boron nitride powder containing rBN at a high concentration.

2. Description of the Prior Art

Rhombohedral system boron nitride (rBN) is important as a starting material for the synthesis of cubic system boron nitride (hereinafter referred to simply as "cBN") by a shock compression method. The presence of hexagonal system boron nitride (hereinafter referred to simply as "hBN") in the starting material is likely to lead an inclusion of wurtzite structure boron nitride (hereinafter referred to simply as "wBN") in the compression product, and the presence of irregularly layer-structured boron nitride tends to decrease the yield of cBN. Accordingly, it is desired to decrease the content of hBN in the starting material.

Heretofore, the preparation of boron nitride has been conducted by (1) a method wherein a mixture of boric acid or borax with potassium cyanide is heated, or (2) a method wherein boron oxide is vaporized, and then reduced and nitrided by e.g. hydrogen cyanide. In the method (1), rBN is obtainable as a mixture with hBN. In the method (2), highly pure rBN is obtainable. However, this method requires expensive installations for the vaporization of boron oxide, and consequently the production cost will be high. Furthermore, these conventional methods require the use of a highly toxic reagent such as potassium cyanide or hydrogen cyanide.

SUMMARY OF THE INVENTION

Applicant's Application Ser. No. 440,998 discloses a process for producing boron nitride with a minimum content of oxygen by heating a mixture of sodium borohydride with ammonium chloride. The boron nitride produced by this process contains a small amount of rBN. It is an object of the present invention to improve this process and to obtain a boron nitride powder containing rBN at a high concentration.

Namely, the present invention provides a process for preparing rhombohedral system boron nitride, which comprises mixing NaBH₄ with at least an equimolar amount of NH₄Cl, and heating the resulting mixture in a non-oxidizing atmosphere at a temperature of at least 750° C. and lower than 1000° C. for at least 3 hours.

Now, the present invention will be described in detail with reference to the preferred embodiments.

BRIEF DESCRIPTION OF THE DRAWINGS

FIG. 6 is a graph of DTA-DTG for NaBH₄—NH₄Cl system.

DETAILED DESCRIPTION OF THE INVENTION

Figure 1:
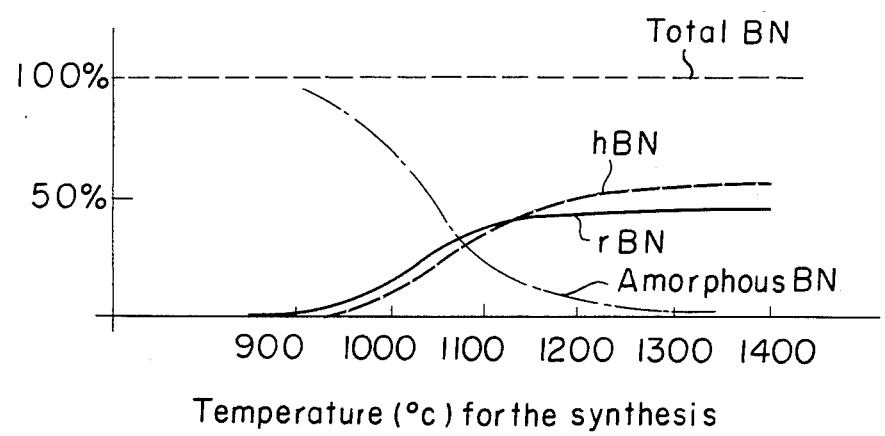
FIG. 1 illustrates the yield of rBN according to the conventional concept.

It used to be believed that the higher the temperature for the synthesis, the better the yield of the crystalline boron nitride such as hBN or rBN, and that at a high temperature, amorphous boron nitride (hereinafter referred to simply as "amorphous BN") is predominantly converted to hBN and accordingly, the yield of rBN will not increase at a temperature higher than a certain high temperature. This is illustrated in FIG. 1.

For instance, as described in Example 1 of Applicant's Application Ser. No. 440,998, the product obtained from the heat treatment at a temperature of 1050° C. is mainly composed of amorphous BN and contains only a trace amount of rBN. Further, it is known that at a temperature of 1100° C., a boron nitride powder containing about 50% of poorly crystalline rBN is obtainable. Thus, so far as the prior art is concerned, the content of rBN is highest at 1100° C. and at most 50% by weight.

Figure 2:
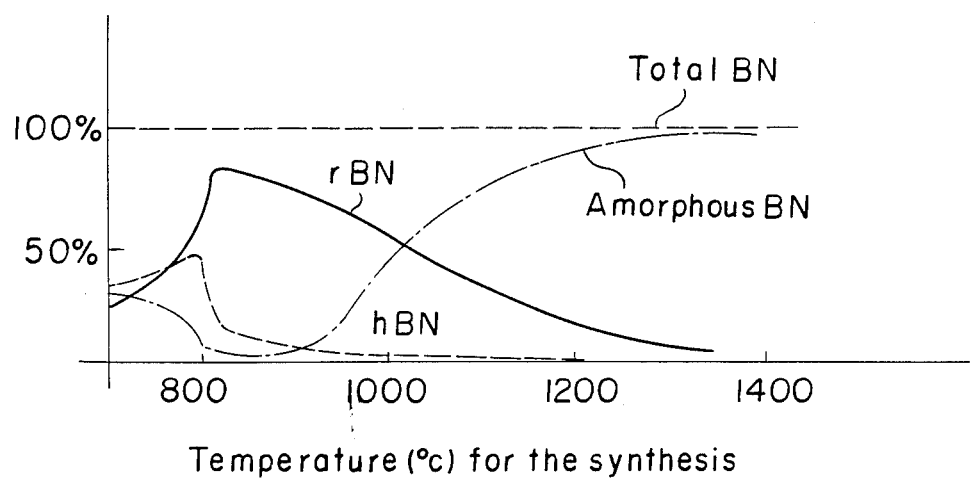
FIG. 2 illustrates the yield of rBN according to the concept of the present invention.

Realizing that the formation of rBN is attributable to the presence of a monovalent anion such as —CN or —Cl in the starting material, the present inventors have studied the functions of such an anion. As a result, it has been found that the optimum temperature for the formation of rBN is, as shown in FIG. 2, far lower than 1100° C. which used to be believed optimum. From further experiments conducted on the basis of this discovery, it has been found that the low temperature heating (i.e. at a temperature of from 750° C. to less than 1000° C.) in a non-oxidizing atmosphere is extremely effective for the synthesis of rBN particularly when conducted for a long period of time i.e. at least 3 hours.

The reaction of NaBH₄ with NH₄Cl may be represented by the following formulas:

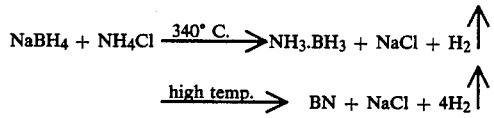

Thus, this reaction may be reduced to the dehydrogenation reaction of borazine in the presence of sodium chloride.

The DTG(differential thermogravimetry) and DTA(differential thermal analysis) data of this reaction are shown in FIG. 6. It is observed that the scattering of a low molecular weight component starts from a temperature in the vicinity of 200° C.

It is assumed that when the boron nitride layer grows, a part of chlorine ions of NaCl formed by the above reaction coordinates with the boron atoms at the surface layer of the boron nitride, whereby the surface layer of the boron nitride undergoes a structural change from a flat structure due to the sp² bond to a crease structure due to the sp³ bond, and the positive effective charge of the nitrogen atoms at the flat structure boron nitride layer prior to the coordination will be replaced by a lone pair of electrons, which will, in turn, interact with the effective charge of the atoms of the boron nitride layer beneath the surface layer to stabilize the formation of growth of the rBN layer. This means that it is possible to synthesize rBN in good yield by selecting the optimum condition for the effective coordination of the chlorine ions. The optimum condition is as illustrated in FIG. 2. Namely, (1) at a temperature lower than the melting point (about 800° C.) of NaCl, the chlorine ions are inactive since NaCl is stable in a solid state at such a low temperature, (2) at a high temperature, the coordination bond is likely to break; especially at a temperature higher than the boiling point (1420° C.) of NaCl, NaCl vaporizes and does not serve for the formation of rBN, and (3) therefore, the optimum temperature for the coordination of the chlorine ions with the boron atoms is in the vicinity of the melting point (800° C.) of NaCl. This has been experimentally confirmed as follows.

Figure 3:
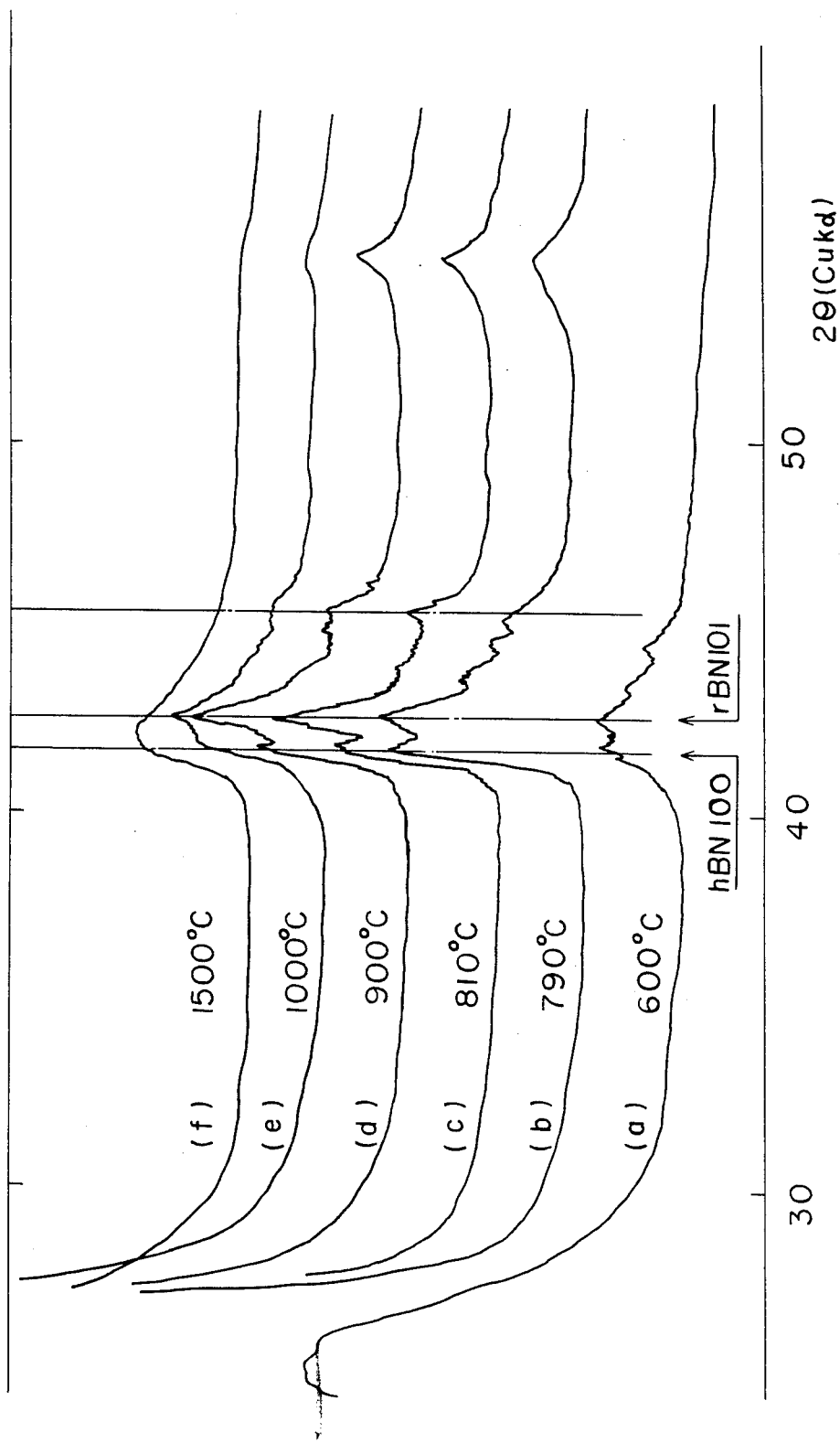
FIG. 3 shows the X-ray diffraction patterns of the products obtained by the heat treatment at various temperatures for 3 hours.

FIG. 3 shows the X-ray diffraction patterns of boron nitride obtained by the heat treatment at various temperatures for 3 hours. By the heat treatment at a temperature of from 810° to 900° C., the yield of rBN is extremely high. The yield of rBN decreases as the temperature rises beyond this range, and at 1500° C., the product is mostly composed of irregularly layered boron nitride. Further, it is seen that the yield of rBN decreases at 790° C. or below. Thus, the heat treatment for the formation of rBN is most effective at a temperature in the vicinity of slightly higher than the melting point (800° C.) of NaCl.

Figure 4:
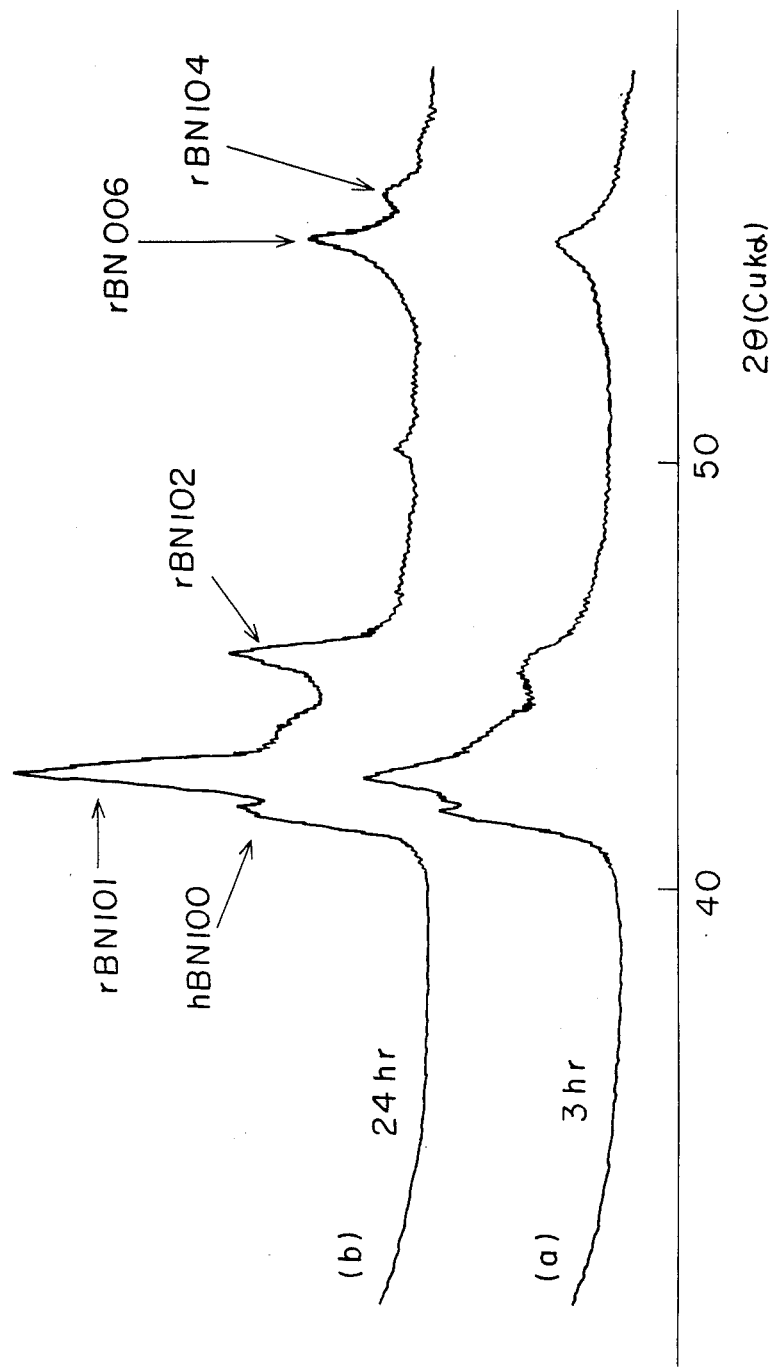
FIG. 4 shows the X-ray diffraction patterns of the products obtained by the heat treatment at 900° C. for extended periods of time.

Further, from the X-ray diffraction patterns in FIG. 4, it is evident that the yield as well as the crystallinity of rBN is remarkably improved by the heating for an extended period of time. Namely, from the experiment of the heat treatment at 900° C. for 24 hours, the X-ray diffraction peak of rBN 102 which used to be scarecely recognized by a conventional method and the X-ray diffraction peak of rBN 104 which was not previously observed at all, are clearly observed, and yet the content of rBN is as high as about 90%.

Now, the operation of the process of the present invention will be described.

The mixing ratio of NH$_4$Cl to NaBH$_4$ is preferably such that the molar ratio of nitrogen to boron is at least an equimolar amount. If the amount of boron is excessive, the product tends to include amorphous boron, whereby the product tends to be colored black.

The mixing is conducted in a dried gas atmosphere. If a moisture is present, boric acid tends to form, whereby hBN is likely to be formed.

The mixture is placed in a crucible. The crucible is preferably made of a material which is hardly reactive with the mixture. It is preferred to employ a crucible made of sintered boron nitride. However, such a crucible is expensive. In this respect, a crucible made of a stainless steel may be employed at a low cost although it reacts with the mixture to some extent.

The heating source may be of any type. However, the furnace wall is preferably made of a material resistant to NH$_4$Cl gas. In the following Examples, a furnace tube made of stainless steel (Sus 303S) was employed, which is inexpensive and strong although being reactive to some extent.

The heating atmosphere is required to be non-oxidizing. It is preferred to use nitrogen since it is effective to prevent the decomposition of boron nitride and it is inexpensive and can readily be purified at a low cost. However, it is of course, possible to employ other non-oxidizing atmospheres such as an ammonia gas atmosphere or an argon gas atmosphere.

When heated abruptly, it is likely that the starting materials undergo abrupt decomposition and are likely to scatter. On the other hand, when the temperature is raised slowly, the yield tends to decrease due to the formation of volatile intermediate products or the evaporation of NH$_4$Cl. Accordingly, it is preferred to heat the mixture rapidly to a temperature of about 600° C. so as to quickly pass the temperature range of from 200° to 500° C. where low volatile components are otherwise likely to form. Then, it is preferred to bring the temperature quickly to the specified temperature of at least 750° C., preferably 800° C. Thus, it is possible to reduce the formation of hBN which is likely to form at a low temperature.

The sintering at the final stage is conducted at a temperature in the vicinity of the melting point (800° C.) of NaCl. At a temperature lower than 750° C., the formation of rBN is extremely slow. On the other hand, at a temperature equal to the boiling point (1420° C.) of NaCl or higher, rBN does not form. Thus, in order to obtain boron nitride containing rBN, the temperature should be less than 1400° C. The practical temperature is within a range of at least 750° C. and lower than 1000° C., and the optimum temperature is within the range of from 800° to 950° C.

The heating time is at least 1 hour, but practically at least 3 hours. The longer the heating time, the better the yield, provided NaCl remains in the reaction system. Preferably, the heating time is at least 10 hours.

The final product is obtained by washing with water to remove NaCl. The rBN obtainable by the present invention is a white or light yellow powder. The product contains at least 98% of boron nitride, the yield is at least 95% of the theoretical value, and the rBN content is at least 60%. The rBN content was at least 90%, when the heat treatment was conducted at 905° C. for 24 hours. The rest was composed of hBN and amorphous BN. The hBN content was not substantially related to the temperature for the synthesis.

Figure 5:
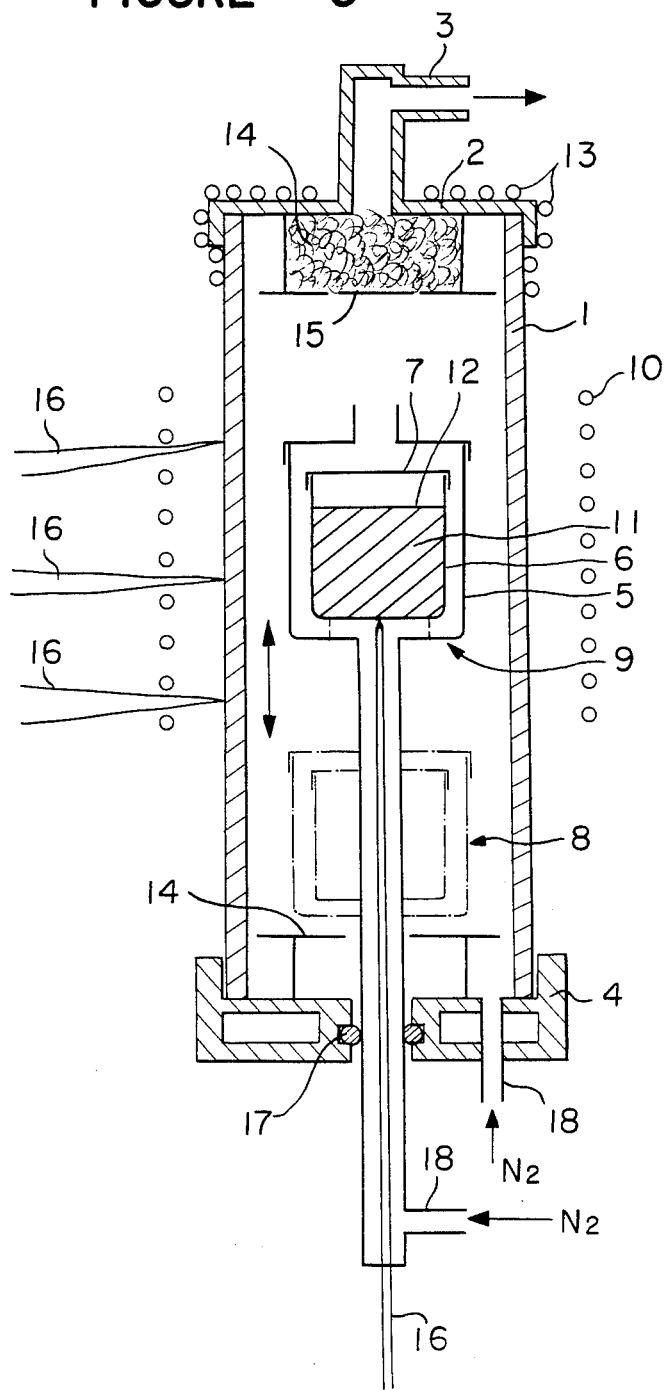
FIG. 5 is a vertical cross-section of a Kanthal furnace used for carrying out the process of the present invention.

FIG. 5 illustrates a Kanthal furnace used for the synthetis of the present invention. The furnace comprises a furnace tube 1 made of stainless steel, a top cover 2 provided with an exhaust gas outlet 3, and water cooled bottom cover 4. A stainless steel receptacle 5 for a stainless steel crucible 6, provided with a stainless steel lid 7, is vertically movable in the furnace tube 1 between a first crucible position indicated at reference numeral 8 and a crucible position during the heating indicated at reference numeral 9. Reference numeral 10 designates a Kanthal heater, numeral 11 indicates the starting material mixture, numeral 12 designates a stainless steel inner cover, numeral 13 designates a cooling pipe, numeral 14 designates a stainless steel filter, numeral 15 designates a reflecting plate, numeral 16 designates a thermocouple and numeral 17 designates an o-ring seal. A non-oxidizing gas such as nitrogen gas is fed through a non-oxidizing gas inlets 18.

Now, the present invention will be described in detail with reference to Examples. However, it should be understood that the present invention is by no means restricted by these specific Examples.

EXAMPLE 1

NaBH$_4$ and NH$_4$Cl were mixed in a molar ratio of 1:1.1. After an addition of hexane, the mixture was thoroughly mixed in a ball mill, and then heated to 80° C. in a nitrogen stream to remove hexane. 20 g of the mixture thus obtained was placed in a stainless steel cruicible, which was then set at the lower portion of the Kanthal furnace as shown in FIG. 5. The furnace was flushed with nitrogen, and the central portion of the furnace was preliminarily heated to 600° C. Then, the cruicible containing the mixture was moved to the central portion where the temperature was 600° C. When the temperature of the cruicible reached 550° C., the temperature was rapidly raised to 810° C. and held at that temperature for 3 hours. Then, the product was rapidly cooled to room temperature, taken out, washed with water to remove sodium chloride and then dried. The boron nitride thus obtained was white or light yellow. From the gravimetric analysis, the yield of boron nitride was found to be 96% of the theoretical value. From the chemical analysis, the boron nitride was at least 99% by weight. The X-ray diffraction pattern is shown at (c) in FIG. 3. From the measurement of the surface area of the peaks, the rBN content was found to be at least 70%. In addition to the rBN 101 peak, the rBN 102 peak which was scarecely observed in the conventional method, was distinctly observed.

EXAMPLE 2

In the same manner as in Example 1, the mixture was heated at 900° C. for 24 hours. The yield, the content and the color of the boron nitride thus obtained were the same as those of Example 1. The X-ray diffraction pattern is shown at (b) in FIG. 4. In addition to the rBN 101 peak, the rBN 104 peak was distinctly observed, thus indicating a remarkable improvement in the crystallinity. From the measurement of the width of the rBN 101 peak, the rBN content was found to be about 85%.

In FIGS. 3 and 4, the notation of 100, 101, etc. is based on the hexagonal crystal system.

What is claimed is:

1. A process for preparing rhombohedral system boron nitride, which comprises mixing NaBH$_4$ with at least an equimolar amount of NH$_4$Cl, and heating the resulting mixture in a non-oxidizing atmosphere at a temperature of at least 750° C. and lower than 1000° C. for at least 3 hours.

2. The process according to claim 1, wherein the mixture is rapidly heated so as to quickly pass the temperature range of from 200° to 500° C.

3. The process according to claim 1, wherein the mixture is rapidly heated to a temperature of 800° C.

4. The process according to claim 1, wherein the mixture is heated at a temperature of from 800° to 950° C.

5. The process according to claim 1, wherein the mixture is heated for at least 10 hours.

6. The process according to claim 1, wherein the non-oxidizing atmosphere is a nitrogen gas atmosphere.

7. The process according to claim 4, wherein the mixture is heated at a temperature from 810° to 900° C.

8. The process according to claim 4, wherein the mixture is heated at a temperature of 905° C. for 24 hours.

* * * * *